United States Patent
Ryu et al.

(10) Patent No.: US 9,970,339 B2
(45) Date of Patent: May 15, 2018

(54) METHOD FOR CONTROLLING OF VALVE TIMING OF CONTINUOUS VARIABLE VALVE DURATION ENGINE

(71) Applicant: HYUNDAI MOTOR COMPANY, Seoul (KR)

(72) Inventors: In Sang Ryu, Incheon (KR); Kyoung Pyo Ha, Seongnam-si (KR); You Sang Son, Suwon-si (KR); Kiyoung Kwon, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 181 days.

(21) Appl. No.: 15/165,550

(22) Filed: May 26, 2016

(65) Prior Publication Data
US 2017/0167318 A1 Jun. 15, 2017

(30) Foreign Application Priority Data

Dec. 11, 2015 (KR) .......................... 10-2015-0176782

(51) Int. Cl.
*F01L 1/34* (2006.01)
*F01L 13/00* (2006.01)
*F02D 41/00* (2006.01)

(52) U.S. Cl.
CPC ...... *F01L 13/0015* (2013.01); *F02D 41/0007* (2013.01); *F01L 2800/00* (2013.01); *F02D 2041/001* (2013.01); *Y02T 10/144* (2013.01)

(58) Field of Classification Search
CPC .............. F01L 13/0015; F01L 2800/00; F02D 41/0007; F02D 2041/001; Y02T 10/144
See application file for complete search history.

(56) References Cited

U.S. PATENT DOCUMENTS 8,001,936 B2 * 8/2011 Nakamura .............. F01L 1/267
123/346

FOREIGN PATENT DOCUMENTS

| JP | 2006-118381 A | 5/2006 |
| JP | 2008-151059 A | 7/2008 |
| JP | 2008-274963 A | 11/2008 |
| JP | 2010-216464 A | 9/2010 |

* cited by examiner

*Primary Examiner* — Zelalem Eshete
(74) *Attorney, Agent, or Firm* — Brinks Gilson & Lione

(57) ABSTRACT

A system and a method for controlling valve timing of a continuous variable valve duration engine that simultaneously controls duration and timing of the valve by mounting a continuous variable valve duration device on an intake of turbo engine and mounting a continuous variable valve timing device on an exhaust is disclosed. The method includes: classifying a plurality of control regions depending on engine speed and load; applying a maximum duration to an intake valve and limiting an overlap to an exhaust valve; applying the maximum duration to the intake valve and adjusting the overlap by using an exhaust valve close timing; advancing an intake valve close timing; approaching an intake valve close timing to bottom dead center; controlling a wide open throttle valve and controlling the intake valve close timing to after bottom dead center; and controlling the wide open throttle valve and advancing the intake valve close timing.

12 Claims, 6 Drawing Sheets

METHOD FOR CONTROLLING OF VALVE TIMING OF CONTINUOUS VARIABLE VALVE DURATION ENGINE

CROSS-REFERENCE TO RELATED APPLICATION

This application claims priority to and the benefit of Korean Patent Application No. 10-2015-0176782 filed on Dec. 11, 2015, the entirety of which is hereby incorporated by reference.

FIELD

The present disclosure relates to a system and a method for controlling valve timing of a continuous variable valve duration engine.

BACKGROUND

The statements in this section merely provide background information related to the present disclosure and may not constitute prior art.

An internal combustion engine combusts mixed gas in which fuel and air are mixed at a predetermined ratio through a set ignition mode to generate power by using explosion pressure.

Generally, a camshaft is driven by a timing belt connected with a crankshaft that converts linear motion of a cylinder by the explosion pressure into rotating motion to actuate an intake valve and an exhaust valve, and while the intake valve is opened, air is suctioned into a combustion chamber, and while an exhaust valve is opened, gas which is combusted in the combustion chamber is exhausted.

To improve the operations of the intake valve and the exhaust valve and thereby improve engine performance, a valve lift and a valve opening/closing time (timing) are controlled according to a rotational speed of an engine. Therefore, a continuous variable valve duration (CVVD) device controlling the opening duration of an intake valve and an exhaust valve of the engine and a continuous variable valve timing (CVVT) device controlling the opening and closing timing of the intake valve and the exhaust valve of the engine have been developed.

The CVVD device adjusts duration of the valve by controlling an open time of the valve. In addition, the CVVT device advances or delays opening and closing timing of the valve in a state of fixing the open time of the valve. That is, if the opening timing of the valve is determined, the closing timing is automatically determined according to the open duration of the valve.

However, since both the CVVD device and the CVVT device are used in the engine, the duration and timing of the valve should be simultaneously controlled.

SUMMARY

The present disclosure provides a system and a method for controlling valve timing of a continuous variable valve duration engine that simultaneously controls duration and timing of the valve by mounting a continuous variable valve duration device on an intake of turbo engine and mounting a continuous variable valve timing device on an exhaust.

A method for controlling valve timing of a turbo engine provided with a continuous variable valve duration (CVVD) device at an intake and a continuous variable valve timing (CVVT) device at an exhaust according to an embodiment of the present disclosure may include: classifying as a plurality of control regions depending on an engine speed and an engine load; applying a maximum duration to an intake valve and limiting an overlap to an exhaust valve in a first control region; applying the maximum duration to the intake valve and adjusting the overlap by using an exhaust valve close (EVC) timing in a second control region; advancing an intake valve close (IVC) timing in a third control region; approaching an intake valve close (IVC) timing to bottom dead center in a fourth control region; controlling a wide open throttle valve (WOT) and controlling the intake valve close (IVC) timing to after bottom dead center in a fifth control region; and controlling the wide open throttle valve and advancing the intake valve close (IVC) timing in a sixth control region.

The overlap may be limited by delaying the IVC timing as a maximum value and setting the EVC timing as a maximum value to maintain combustion stability in the first control region.

The overlap may be increased by delaying the EVC timing until the engine load reaches a predetermined load and may be reduced by advancing the EVC timing when the engine load is increased more than the predetermined load in the second control region.

The IVC timing may be advanced close to bottom dead center when the engine speed is below a predetermined speed, and the IVC timing may be advanced after the bottom dead center when the engine speed is over the predetermined speed in the third control region.

The IVC timing may be approached to bottom dead center and the EVC timing may be approached to top dead center in the fourth control region.

The EVC timing may be approached close to top dead center to prevent or minimize the overlap in the sixth control region.

A system for controlling valve timing of a continuous variable valve duration engine provided with a turbo charger according to another embodiment of the present disclosure may include: a data detector detecting data related to a running state of the vehicle; a camshaft position sensor detecting a position of a camshaft; an intake continuous variable valve duration (CVVD) device controlling an opening time of an intake valve of the engine; an exhaust continuous variable valve timing (CVVT) device controlling an opening and closing timing of the exhaust valve of the engine; and a controller configured to classify as a plurality of control regions depending on an engine speed and an engine load based on signals from the data detector and camshaft position sensor and control the intake CVVD device and the exhaust CVVT device according to the control region, wherein the controller applies a maximum duration to an intake valve and limiting an overlap at an exhaust valve in a first control region, applies the maximum duration to the intake valve and adjusts the overlap by using an exhaust valve close (EVC) timing in a second control region, advances an intake valve close (IVC) timing in a third control region, approaches the intake valve close (IVC) timing close to bottom dead center in a fourth control region, controls a wide open throttle valve (WOT) and the intake valve close (IVC) timing after bottom dead center in the fifth control region, and controls a wide open throttle valve (WOT) and advancing the intake valve close (IVC) timing in the sixth control region.

The controller may delay the IVC timing as a maximum value and set the EVC timing as a maximum value to maintain combustion stability in the first control region.

The controller may increase the overlap by delaying the EVC timing until the engine load reaches a predetermined load, and reduce the overlap by advancing the EVC timing when the engine load is increased more than the predetermined load in the second control region.

The controller may approach the IVC timing to bottom dead center when the engine speed is below a predetermined speed, and advance the IVC timing after the bottom dead center when the engine speed is over the predetermined speed in the third control region.

The controller may approach the IVC timing to bottom dead center and the EVC timing to top dead center in the fourth control region.

The controller may approach the EVC timing to top dead center not to occur the overlap in the sixth control region.

As described above, according to an embodiment of the present disclosure, duration and timing of the continuous variable valve are simultaneously controlled, so the engine may be controlled under improved conditions.

That is, opening timing and closing timing of the intake valve and the exhaust valve are controlled, thereby improving fuel efficiency under a partial load condition and power performance under a high load condition. In addition, a starting fuel amount may be reduced by increasing a valid compression ratio, and exhaust gas may be reduced by shortening time for heating a catalyst.

In addition, the continuous variable valve timing duration device may be replaced by an open fixed shape device at intake and the continuous variable valve duration device may be replaced by a fixed cam at exhaust, therefore manufacturing costs may be reduced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, references being made to the accompanying drawings, in which.

Figure 1:
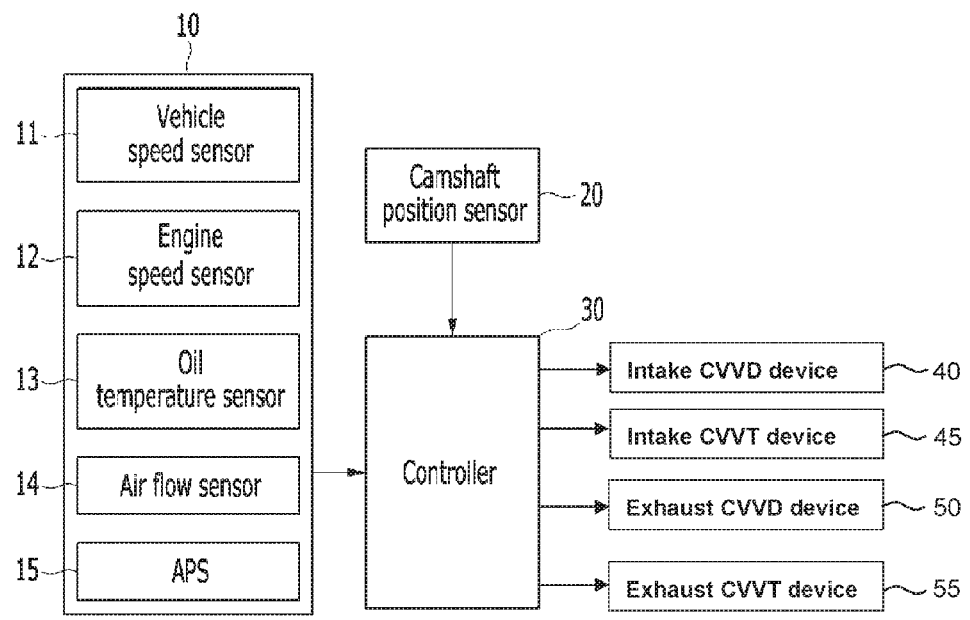
FIG. 1 is a schematic block diagram showing a system for controlling valve timing of a continuous variable valve duration engine according to an embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, only certain embodiments of the present disclosure have been shown and described, simply by way of illustration. As those skilled in the art would realize, the described embodiments may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

Like reference numerals designate like elements throughout the specification.

It is understood that the term "vehicle" or "vehicular" or other similar terms as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example a gasoline-powered and electric-powered vehicle.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

An embodiment of the present disclosure will hereinafter be described in detail with reference to the accompanying drawings.

FIG. 1 is a schematic block diagram showing a system for controlling valve timing of a continuous variable valve duration engine according to an embodiment of the present disclosure.

As shown in FIG. 1, a system for controlling valve timing of a continuous variable valve duration engine according to an embodiment of the present disclosure includes a data detector 10, a camshaft position sensor 20, a controller 30, an intake continuous variable valve duration (CVVD) device 40, an intake continuous variable valve timing (CVVT)

device 45, an exhaust continuous variable valve duration (CVVD) device 50, and an exhaust continuous variable valve timing (CVVT) device 55.

The data detector 10 detects data related to a running state of the vehicle for controlling the CVVD devices and the CVVT devices, and includes a vehicle speed sensor 11, an engine speed sensor 12, an oil temperature sensor 13, an air flow sensor 14, and an accelerator pedal position sensor 15.

The vehicle speed sensor 11 detects a vehicle speed, transmits a corresponding signal to the controller 30, and is mounted at a wheel of the vehicle.

The engine speed sensor 12 detects a rotation speed of the engine from a change in phase of a crankshaft, and transmits a corresponding signal to the controller 30.

The oil temperature sensor (OTS) 13 detects temperature of oil flowing through an oil control valve (OCV), and transmits a corresponding signal to the controller 30.

The oil temperature detected by the oil temperature sensor 13 may be measured by determining a coolant temperature by using a coolant temperature sensor mounted at a coolant passage of an intake manifold. Therefore, in this specification and the scope of the appended claims, the oil temperature sensor 13 may include a coolant temperature sensor, and the oil temperature should be understood to include the coolant temperature.

The air flow sensor 14 detects an air amount drawn into the intake manifold, and transmits a corresponding signal to the controller 30.

The accelerator pedal position sensor 15 detects a degree at which a driver pushes an accelerator pedal, and transmits a corresponding signal to the controller 30. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake pipe may be used instead of the accelerator pedal position sensor 15. Therefore, in this specification and the scope of the appended claims, the accelerator pedal position sensor 15 may include a throttle valve position sensor, and the position value of the accelerator pedal should be understood to include an opening value of the throttle valve.

The camshaft position sensor 20 detects a change of a camshaft angle, and transmits a corresponding signal to the controller 30.

Figure 2:
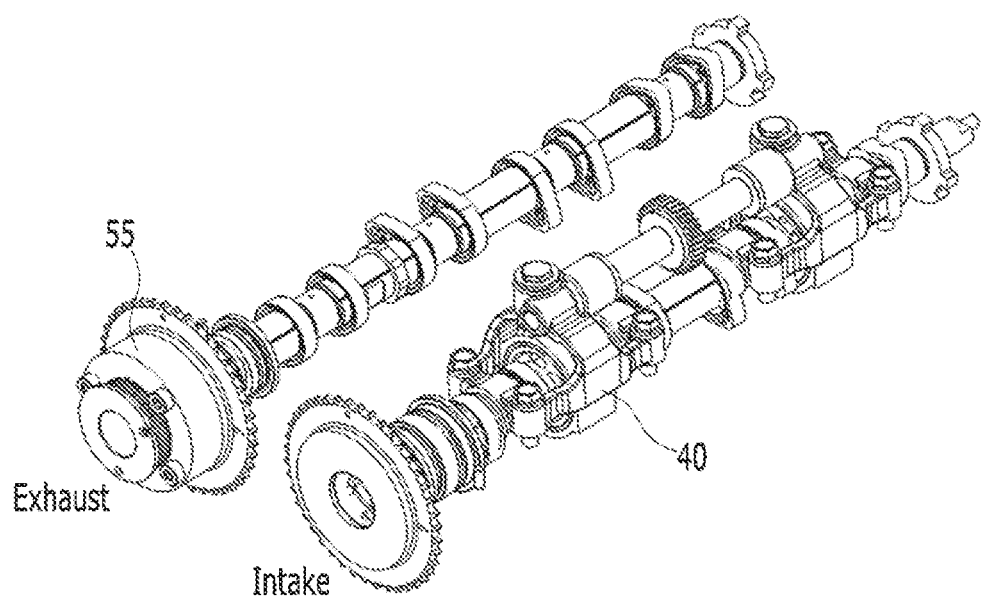
FIG. 2 is a perspective view showing an intake to which a continuous variable valve duration device is mounted and an exhaust to which a continuous variable valve timing device is mounted according to an embodiment of the present disclosure.

FIG. 2 is a perspective view showing an intake to which a continuous variable valve duration device 40 is mounted and an exhaust to which a continuous variable valve timing device 55 is mounted according to an embodiment of the present disclosure.

As shown in FIG. 2, the continuous variable valve duration device 40 is mounted at the intake by the fixed shape device, and the continuous variable valve timing device 55 is mounted at the exhaust by the fixed cam.

Accordingly, in the embodiment of the present disclosure, the intake valve open (IVO) timing and the exhaust valve duration (EVD) are fixed. For example, it is advantageous that the IVO timing has a value in the vicinity of top dead center at most partial load regions for fuel consumption, therefore the IVO timing may be fixed as 0-10 degrees before top dead center. Further, fuel consumption and high speed performance is improved as the EVD has a long duration, therefore the EVD may be fixed as 210-230 degrees.

The intake continuous variable valve duration (CVVD) device 40 controls an opening time of an intake valve of the engine according to a signal from the controller 30.

The exhaust continuous variable valve timing (CVVT) device 55 controls opening and closing timing of the exhaust valve of the engine according to a signal from the controller 30.

The controller 30 classifies a plurality of control regions depending on an engine speed and an engine load based on signals from the data detector 10 and camshaft position sensor 20, and controls the intake CVVD device 40 and the exhaust CVVT device 55 according to the control region. Herein, the plurality of control regions may be classified into six regions.

As describe above, the IVO timing and the EVD are fixed, therefore the controller 30 may control the intake valve close (IVC) timing and the exhaust valve close (EVC) timing by the intake continuous variable valve duration (CVVD) device 40 and the exhaust continuous variable valve timing (CVVT) device 55. That is, the exhaust valve open (EVO) timing may be dependently determined according to the exhaust valve duration (EVD) when the exhaust valve close (EVC) timing is controlled.

The controller 30 applies a maximum duration to an intake valve and limits an overlap to an exhaust valve in a first control region, applies the maximum duration to the intake valve and adjusts the overlap by using an exhaust valve close (EVC) timing in a second control region, advances an intake valve close (IVC) timing in a third control region, approaches the intake valve close (IVC) timing to bottom dead center in a fourth control region, controls a wide open throttle valve (WOT) and the intake valve close (IVC) timing after bottom dead center in the fifth control region, and controls a wide open throttle valve (WOT) and advancing the intake valve close (IVC) timing in the sixth control region.

For these purposes, the controller 30 may be implemented as at least one processor that is operated by a predetermined program, and the predetermined program may be programmed in order to perform each step of a method for controlling valve timing of a continuous variable valve duration engine according to an embodiment of the present disclosure.

Various embodiments described herein may be implemented within a recording medium that may be read by a computer or a similar device by using software, hardware, or a combination thereof, for example.

The hardware of the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform any other functions.

The software such as procedures and functions of the embodiments described in the present disclosure may be implemented by separate software modules. Each of the software modules may perform one or more functions and operations described in the present disclosure. A software code may be implemented by a software application written in an appropriate program language.

Hereinafter, a method for controlling valve timing of a continuous variable valve duration engine according to an embodiment of the present disclosure will be described in detail with reference to FIG. 3A to FIG. 5.

Figure 3A:
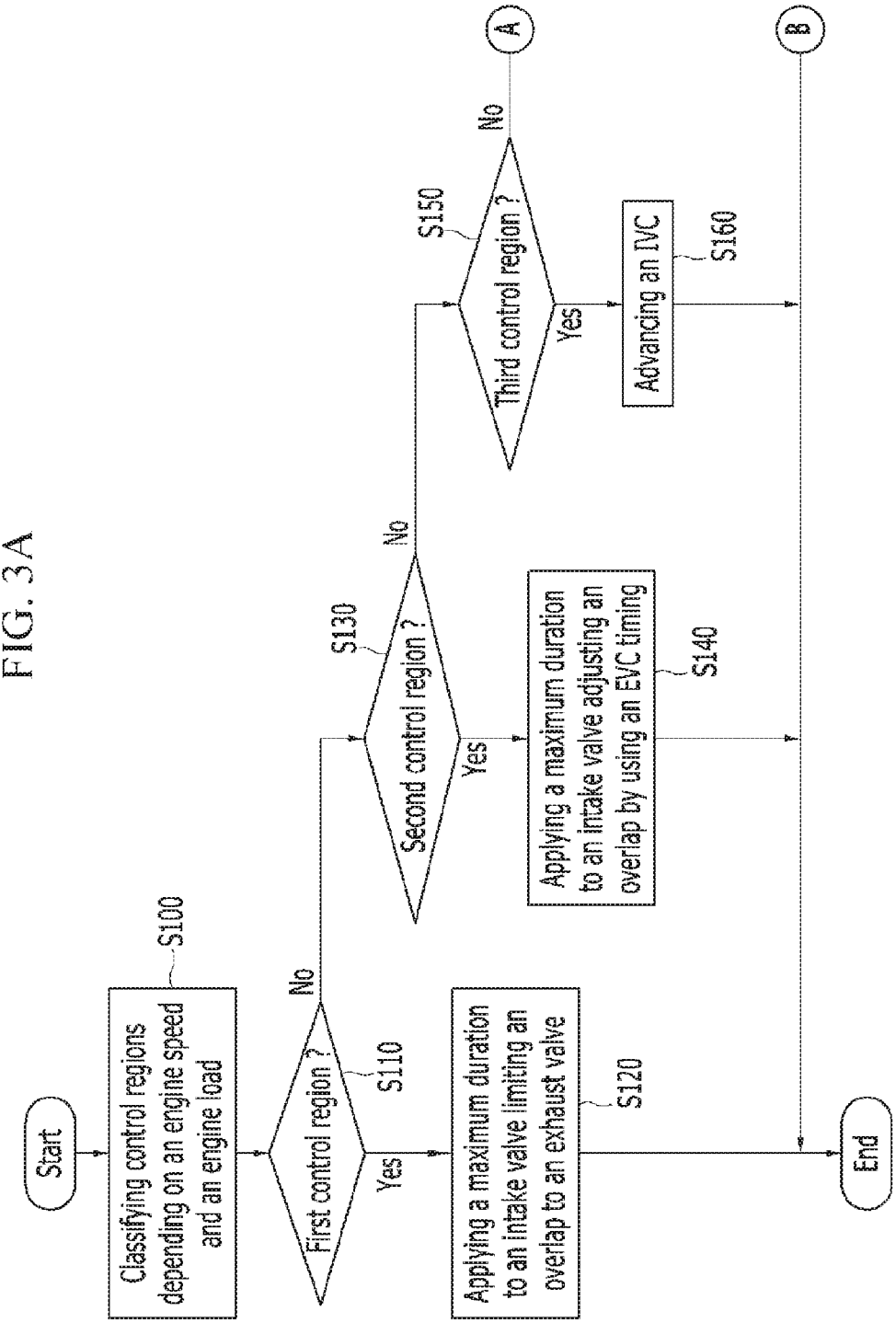
FIG. 3A and FIG. 3B are flowcharts showing a method for controlling valve timing of a continuous variable valve duration engine according to an embodiment of the present disclosure.
Figure 3B:
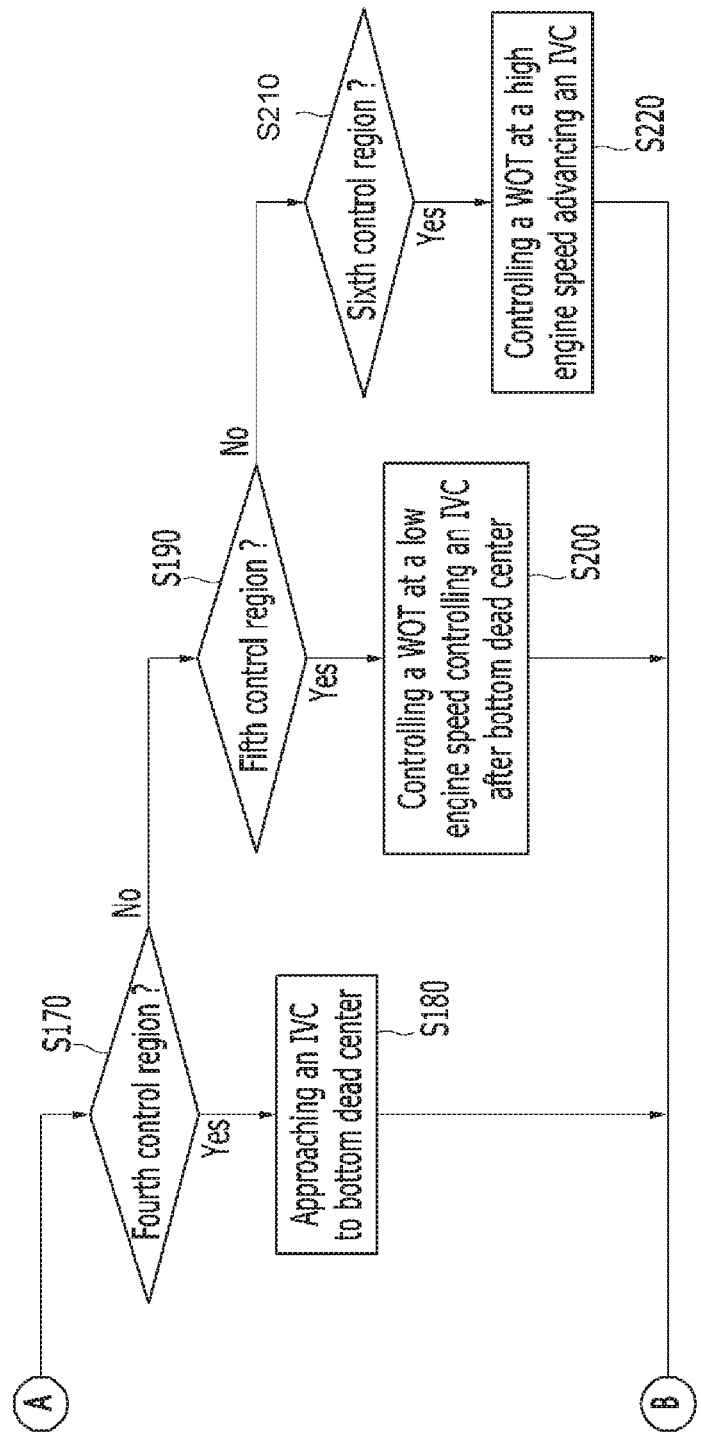

FIG. 3A and FIG. 3B are flowcharts showing a method for controlling valve timing of a continuous variable valve duration engine according to an embodiment of the present disclosure. In addition, FIG. 4 is a graph showing duration, opening timing, and closing timing of an intake valve depending on an engine load and an engine speed according to an embodiment of the present disclosure, and FIG. 5 is a graph showing duration, opening timing, and closing timing of an exhaust valve depending on an engine load and an engine speed according to an embodiment of the present disclosure.

Figure 4:
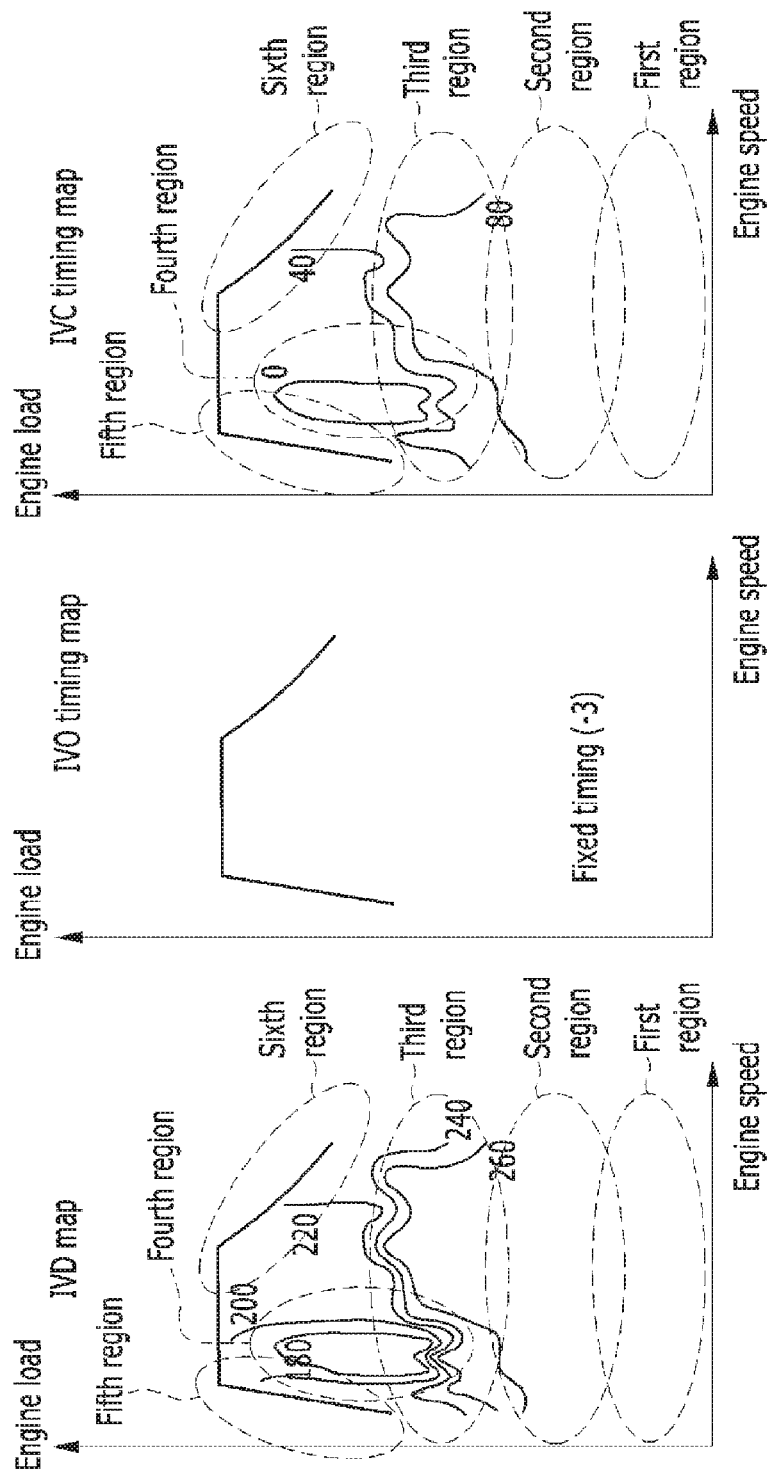
FIG. 4 is a graph showing duration, opening timing, and closing timing of an intake valve depending on an engine load and an engine speed according to an embodiment of the present disclosure.
Figure 5:
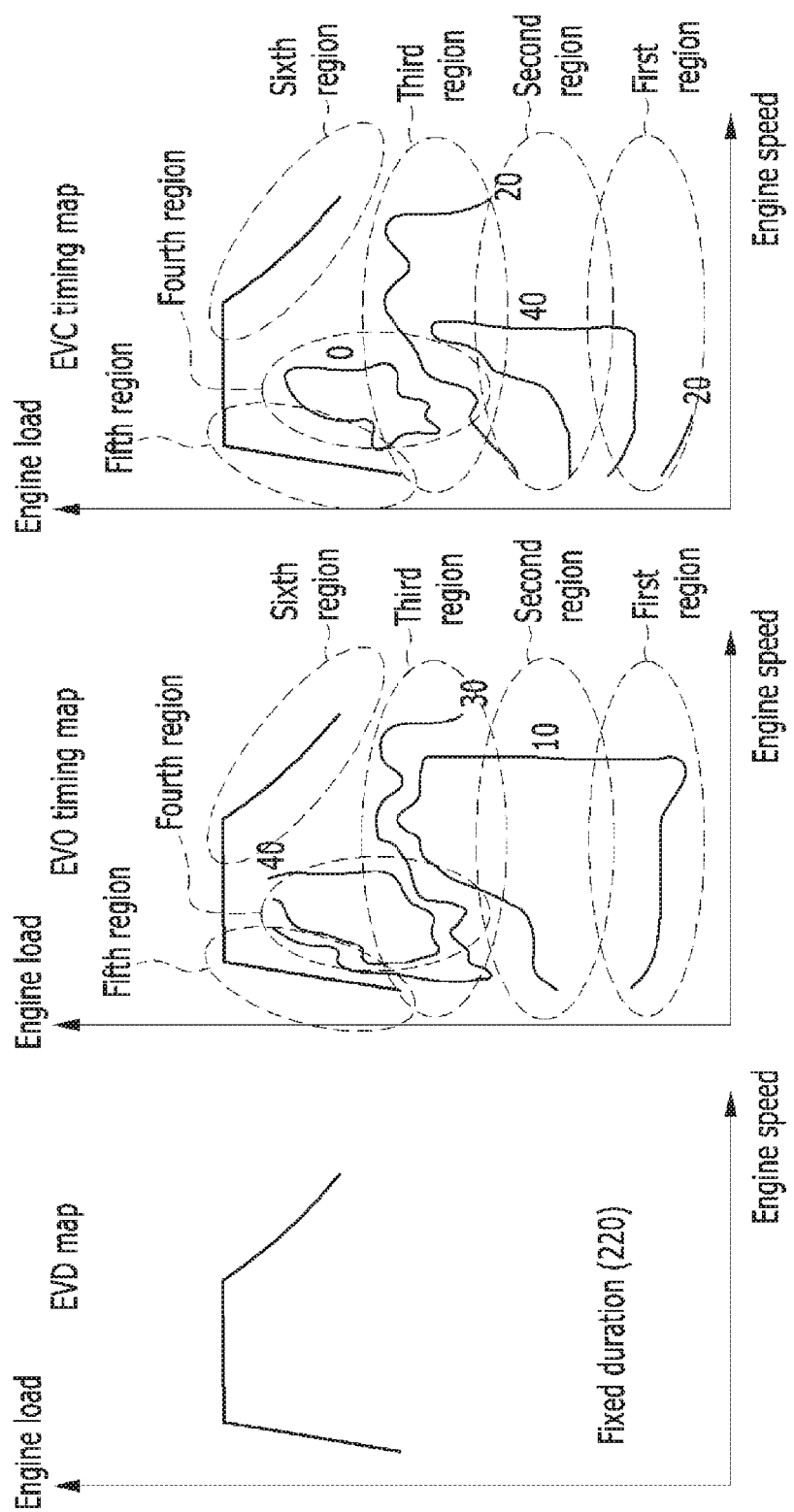
FIG. 5 is a graph showing duration, opening timing, and closing timing of an exhaust valve depending on an engine load and an engine speed according to an embodiment of the present disclosure.

In the FIG. 4 and FIG. 5, an IVD map and an EVD map indicate a crank angle, an IVO timing map indicates an angle before top dead center, an IVC timing map indicates an angle after bottom dead center, an EVO timing map indicates an angle before bottom dead center, and an EVC timing map indicates an angle after top dead center.

As shown in FIG. 3A and FIG. 3B, a method for controlling valve timing of a continuous variable valve duration engine according to an embodiment of the present disclosure starts with classifying a plurality of control regions depending on an engine speed and an engine load by the controller 30 at step S100.

The controller 30 may classify control regions as a first control region when the engine load is less than a first predetermined load, a second control region when the engine load is greater than or equal to the first predetermined load and less than a second predetermined load, and a third control region when the engine load is greater than or equal to the second predetermined load and less than a third predetermined load. In addition, the controller 30 may classify control regions as a fourth region when the engine load is greater than or equal to the second predetermined load and the engine speed is greater than or equal to a first predetermined speed and less than a second predetermined speed, a fifth region when the engine load is greater than or equal to the third predetermined load and the engine speed is less than the first predetermined speed, and a sixth region when the engine load is greater than or equal to the third predetermined load and the engine speed is greater than or equal to the second predetermined speed.

When the control regions are classified according to the engine load and the engine speed at the step S100, the controller 30 determines whether a current engine state belongs to the first control region at step S110.

When the current engine state belongs to the first control region at the step S110, the controller 30 applies a maximum duration to the intake valve and limits an overlap by using the exhaust valve at step S120.

As describe above, the IVO timing is fixed at 0-10 degrees before top dead center, therefore it is advantageous that the controller 30 delays the IVC timing in the first control region when the engine has a low load for fuel consumption. Accordingly, as shown in FIG. 4, the controller 30 may delay the IVC timing to about 100-110 degrees after bottom dead center to maintain the LIVC (Late Intake Valve Close) position.

In addition, the controller 30 may limit the overlap by moving the EVC timing to a direction after top dead center and setting EVC timing as a maximum value to maintain combustion stability.

When the current engine state does not belong to the first control region at the step S110, the controller 30 determines whether the current engine state belongs to the second control region at step S130.

When the current engine state belongs to the second control region at the step S130, the controller 30 applies the maximum duration to the intake valve and controls overlap by using the EVC timing at step S140.

That is, the controller 30 may delay the EVC timing to a direction after top dead center until the engine load increases and reaches the predetermined load to increase overlap.

Herein, overlap increases and intake pumping decreases when the EVC timing is controlled after top dead center, but in the embodiment of the present disclosure, exhaust duration is fixed and the EVO timing is close to bottom dead center, therefore exhaust pumping may increase. Accordingly, the controller 30 may reduce the increased overlap by advancing the EVC timing to a locked position when the engine load is increased more than the predetermined load.

Further, the controller 30 may maintain LIVC(Late Intake Valve Close) position by applying the intake as a maximum duration for preventing knocking according to an increase of the engine load, likewise the first control region.

When the current engine state does not belong to the second control region at the step S130, the controller 30 determines whether the current engine state belongs to the third control region at step S150.

When the current engine state belongs to the third control region at the step S150, the controller 30 advances the IVC timing at step S160.

Since the IVC timing is controlled at the LIVC position (for example, an angle of 100-110 degrees after bottom dead center) in the first and second control regions, knocking may be generated as the engine load is increased. Accordingly, fuel efficiency may be deteriorated as boost pressure is increased and knocking is deteriorated. In order to prevent the effect as described above, the controller 30 advances the IVC timing.

At this time, as shown in FIG. 4, the controller 30 may rapidly advance the IVC timing close to bottom dead center when the engine speed is less than or equal to a predetermined speed, and may slowly advance the IVC timing to an angle of 30-50 degrees after bottom dead center when the engine speed is greater than the predetermined speed so as to reflect the characteristic of the turbo engine. The predetermined speed may be 1500 rpm.

When the current engine state does not belong to the third control region at the step S150, the controller 30 determines whether the current engine state belongs to the fourth control region at step S170.

When the current engine state belongs to the fourth control region at the step S170, the controller 30 approaches the IVC timing to bottom dead center at step S180.

The fourth control region may be a low speed boost region such that the engine load is greater than or equal to the second predetermined load and the engine speed is greater than or equal to the first predetermined speed and less than the second predetermined speed. For example, the first predetermined speed may be 1500 rpm, and the second predetermined speed may be 2500 rpm.

The controller 30 controls the IVC timing close to bottom dead center, thereby improving fuel efficiency. In addition, the controller 30 may prevent the valve overlap by approaching the EVC timing to top dead center. Accordingly, a short intake duration (e.g., 180 degrees) may be used in the fourth control region.

When the current engine state does not belong to the fourth control region at the step S170, the controller 30 determines whether the current engine state belongs to the fifth control region at step S190.

When the current engine state belongs to the fifth control region at the step S190, the controller 30 fully opens a throttle valve and controls the IVC timing after bottom dead center at step S200.

In the turbo engine, if the throttle valve is controlled to be wide open (WOT) when the engine speed is less than the first predetermined speed (e.g., 1500 rpm), intake port pressure becomes higher than exhaust port pressure by boosting. Therefore, an effect of a scavenging phenomenon which emits combustion gas of the exhaust is prominent in the turbo engine compared to a natural aspirated engine.

Accordingly, as shown in FIG. 4, the controller 30 may control the IVC timing at an angle of 0-20 degrees after bottom dead center to generate the scavenging. However, in the embodiment of the present disclosure, since the IVO timing is fixed, the scavenging effect may not be large although the IVC timing is controlled after bottom dead center.

To exaggerate the scavenging effect, the EVO timing should be delayed after bottom dead center. In the embodiment of the present disclosure, the exhaust duration is fixed, and the EVC timing is delayed when the EVO timing is delayed, therefore overlap may increase. Accordingly, the engine performance may decrease in the fifth control region.

When the current engine state does not belong to the fifth control region at the step S190, the controller 30 determines whether the current engine state belongs to the sixth control region at step S210.

When the current engine state belongs to the sixth control region at the step S210, the controller 30 fully opens a throttle valve and advances the IVC timing at step S220.

When WOT control is performed at a high speed condition, knocking is rarely generated in a naturally aspirated engine, however, knocking may be deteriorated in the turbo engine. Thus, as shown in FIG. 4, the controller 30 may advance the IVC timing within an angle of 50 degrees after bottom dead center to reduce knocking by decreasing boost pressure.

Further, when the engine speed is greater than the second predetermined speed (e.g., 2500 rpm) in the sixth control region, the scavenging phenomenon disappears because exhaust port pressure is much higher than intake port pressure. Therefore, as shown in FIG. 5, the controller 30 approaches the EVC timing to top dead center to prevent overlap. At this time, although exhaust duration is fixed, the EVC timing may be controlled because the EVC timing is advanced at an angle of 30 degrees before bottom dead center.

As described above, according to an embodiment of the present disclosure, duration and timing of the continuous variable valve are simultaneously controlled, so the engine may be controlled under improved conditions.

That is, opening timing and closing timing of the intake valve and the exhaust valve are optimally controlled, thereby improving fuel efficiency under a partial load condition and power performance under a high load condition. In addition, a starting fuel amount may be reduced by increasing a valid compression ratio, and exhaust gas may be reduced by shortening time for heating a catalyst.

In addition, the continuous variable valve timing duration device may be omitted by an open fixed shape device at the intake and the continuous variable valve duration device may be omitted by a fixed cam at exhaust, therefore manufacturing costs may be reduced a lot.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling valve timing of a turbo engine provided with a continuous variable valve duration (CVVD) device at an intake and a continuous variable valve timing (CVVT) device at an exhaust, the method comprising:
   Classifying a plurality of control regions depending on an engine speed and an engine load;
   applying a maximum duration to an intake valve and limiting an overlap to an exhaust valve in a first control region;
   applying the maximum duration to the intake valve and adjusting the overlap by using an exhaust valve close (EVC) timing in a second control region;
   advancing an intake valve close (IVC) timing in a third control region;
   approaching the intake valve close (IVC) timing to bottom dead center in a fourth control region;
   controlling a wide open throttle valve (WOT) and controlling the intake valve close (IVC) timing to after bottom dead center in a fifth control region; and
   controlling the wide open throttle valve and advancing the intake valve close (IVC) timing in a sixth control region.

2. The method of claim 1, wherein:
   the overlap is limited by delaying the IVC timing to an IVC maximum value, and setting the EVC timing to an EVC maximum value to maintain combustion stability in the first control region.

3. The method of claim 1, wherein:
   the overlap is increased by delaying the EVC timing until the engine load reaches a predetermined load and is reduced by advancing the EVC timing when the engine load is increased more than the predetermined load in the second control region.

4. The method of claim 1, wherein:
   the IVC timing is advanced close to bottom dead center when the engine speed is below a predetermined speed, and the IVC timing is advanced to after the bottom dead center when the engine speed is over the predetermined speed in the third control region.

5. The method of claim 1, wherein:
   the IVC timing is approached to bottom dead center and the EVC timing is approached to top dead center in the fourth control region.

6. The method of claim 1, wherein:
   approaching the EVC timing to top dead center prevents overlap in the sixth control region.

7. A system for controlling valve timing of a continuous variable valve duration engine provided with a turbo charger, the system comprising:
   a data detector for detecting data related to a running state of a vehicle;
   a camshaft position sensor for detecting a position of a camshaft;
   an intake continuous variable valve duration (CVVD) device for controlling an opening time of an intake valve of the engine;
   an exhaust continuous variable valve timing (CVVT) device for controlling an opening and closing timing of an exhaust valve of the engine; and
   a controller configured to classify a plurality of control regions depending on an engine speed and an engine load based on signals from the data detector and the camshaft position sensor and to control the intake CVVD device and the exhaust CVVT device according to each control region,
   wherein the controller applies a maximum duration to the intake valve and limits an overlap to the exhaust valve in a first control region, applies the maximum duration to the intake valve and adjusts the overlap by using an exhaust valve close (EVC) timing in a second control region, advances an intake valve close (IVC) timing in a third control region, approaches the intake valve close (IVC) timing to bottom dead center in a fourth control region, controls a wide open throttle valve (WOT) and the intake valve close (IVC) timing after bottom dead center in a fifth control region, and controls a wide open throttle valve (WOT) and advances the intake valve close (IVC) timing in a sixth control region.

8. The system of claim 7, wherein:
the controller delays the IVC timing to an IVC maximum value and sets the EVC timing to an EVC maximum value to maintain combustion stability in the first control region.

9. The system of claim 7, wherein:
the controller increases the overlap by delaying the EVC timing until the engine load reaches a predetermined load, and reduces the overlap by advancing the EVC timing when the engine load is increased above the predetermined load in the second control region.

10. The system of claim 7, wherein:
the controller advances the IVC timing close to bottom dead center when the engine speed is below a predetermined speed, and advances the IVC timing to after the bottom dead center when the engine speed is over the predetermined speed in the third control region.

11. The system of claim 7, wherein:
the controller approaches the IVC timing to bottom dead center and the EVC timing to top dead center in the fourth control region.

12. The system of claim 7, wherein:
the controller approaches the EVC timing to top dead center to prevent overlap in the sixth control region.

* * * * *